Aug. 10, 1948.     E. SIRP     2,446,672
METHOD OF MACHINING ARTICLE BLANKS
Filed July 26, 1944
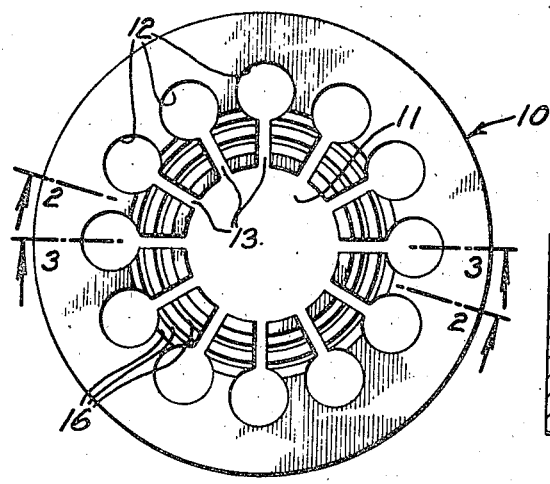
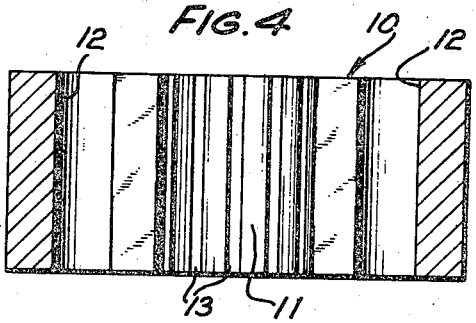
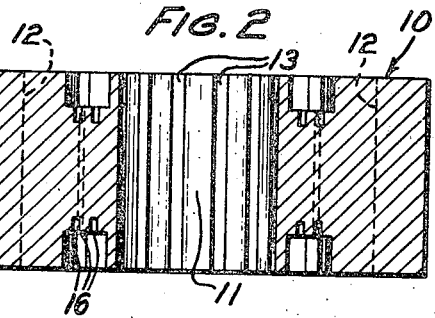
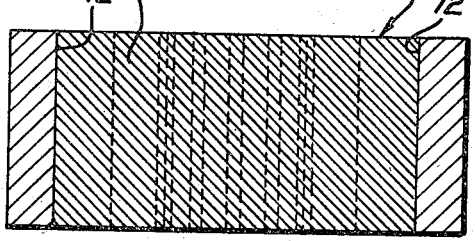
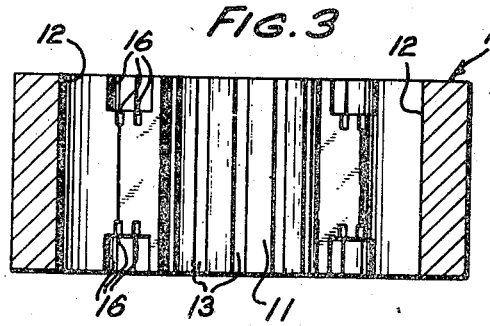
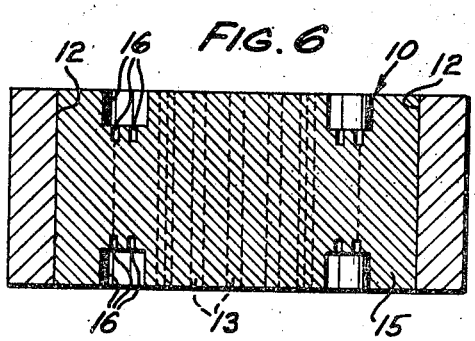
INVENTOR
E. SIRP
BY
ATTORNEY Patented Aug. 10, 1948

2,446,672

UNITED STATES PATENT OFFICE 2,446,672

METHOD OF MACHINING ARTICLE BLANKS

Emil Sirp, Downers Grove, Ill., assignor to Western Electric Company, Incorporated, New York, N. Y., a corporation of New York Application July 26, 1944, Serial No. 546,714

1 Claim. (Cl. 29—25.17)

This invention relates to methods of machining article blanks and more particularly to a method for machining metal article blanks, such as copper anode inserts for magnetron type vacuum tubes.

Such an anode insert blank may comprise an annulus of copper of .025" thickness with an outside diameter of .595" having twelve apertures of .079" diameter in concentric arrangement with respect to a central aperture of .204" diameter, from which twelve slots of .021" in width extend radially, each of which communicates with one of the smaller apertures with its longitudinal median line coinciding with the axes of the central and smaller apertures. To complete the insert blank, it is machined to provide, in each of its end faces, a series of shallow grooves varying in width from .021" to .092", which are concentrically arranged relative to the central aperture and to each other and which intersect the aforementioned twelve slots and smaller apertures. Due to the great number of resultant narrow cross-sections and points at which the grooves in each end face of the insert are interrupted by the twelve radial slots and the twelve apertures, conditions are effected which are most conducive to the formation of burrs at all points of interception.

An object of this invention is to provide a simple, efficient and practicable method of preventing the formation of burrs in the machining of article blanks.

In order to attain this object, in accordance with the features of the invention as applied, for the purpose of disclosure, to the machining of a copper anode insert blank of the type described hereinbefore for use in magnetron vacuum tubes, all the interior spaces of the insert, after the complete machining and burring of the central and smaller apertures and the radial slots, are filled by die casting or otherwise with a material harder than copper, such as, for instance, "Zamac," which is a common zinc base die casting metal. Thereafter, by suitable machining operations, the series of concentric grooves intersecting the aperture and slots may be cut without forming burrs and then the completely machined and filled anode insert is immersed in an acid bath, such as, for example, a hydrochloric acid bath, which serves to completely dissolve the zinc base filling in the insert.

Other objects and advantages of this invention will more fully appear from the following detailed description taken in conjunction with the accompanying drawing, in which Fig. 1 is a greatly enlarged plan view of a copper magnetron anode insert upon completion thereof by the method of this invention;

Figs. 2 and 3 are vertical cross sections taken on the lines 2—2 and 3—3 of Fig. 1;

Fig. 4 is a vertical cross section similar to that of Fig. 3 before the series of concentric channels have been machined in the insert blank;

Fig. 5 is a vertical cross section similar to that of Fig. 4 after undergoing a step of the method comprising filling all the interior spaces thereof with a material harder than copper; and Fig. 6 is a view similar to that of Fig. 5 after the series of concentric channels has been machined in the insert, but before dissolving the filling material by acid.

The method of this invention will be described as practiced in connection with the machining of copper anode inserts for vacuum tubes comprising a copper blank 10 (Figs. 1, 2 and 3), which had been previously machined and burred by well known methods to form therein, as hereinbefore described in detail, a central aperture 11 and twelve apertures 12 concentrically arranged thereto and having twelve radial slots 13, all communicating with the central aperture and one each with one of the smaller apertures.

The blank 10, as thus formed with a plurality of apertures and slots resulting in a plurality of interior spaces, is then filled with a plastic or other supporting material 15 (Figs. 5 and 6), which is harder than the copper of the blank. Preferably, the filling material 15 is injected into the spaces by die casting methods to provide an intimate contact and support for the narrow cross-sections of copper formed in the blank. Such support simulates a condition of machining solid material when a series of shallow concentric grooves 16—16 (Figs. 1, 2, 3 and 6) of the dimensions hereinbefore mentioned are cut by machining operations in the upper and lower faces of the blank. A filling material 15, which has been found suitable for this purpose, is a well-known die casting metal alloy having a trade name of "Zamac" comprising approximately 96% zinc and 4% aluminum and a melting point of approximately 700° F. The blank 10 and die parts may be heated to a temperature of 375° to 400° F. and thereafter the metal alloy is injected into the spaces of the blank, whereupon it solidifies and intimately contacts the interior surfaces of the blank. This material possesses sufficient hardness to oppose displacement of the copper of the blank 10 during the machining of the grooves 16—16 and positively prevents the forming of burrs at the narrow cross-sections and points at which the grooves intersect the twelve radial slots 13 and the twelve apertures 12 of the anode insert.

The filling step is followed by a step of immersing the filled and completely machined anode insert in a suitable acid bath, which is effective to completely dissolve the zinc aluminum filling metal 15 out of the interior spaces, whereupon it appears as shown in Fig. 3. An acid which has been found very suitable for the dissolving of the metal 15 is concentrated hydrochloric acid, which serves to remove the filling metal in a very few minutes from the insert and without harmful action of the acid on the copper, no measurable dimensional change or any change in the surfaces of the copper, under 15X magnification, even from an extended soaking of the insert in the acid, being noticeable.

It is to be understood that the filling metal 15 may be mechanically removed from the insert 10, if desired, by pushing it therefrom by a suitably shaped tool.

What is claimed is:

A method of machining copper anode insert blanks for magnetron type vacuum tubes without the formation of burrs, in which the blank has preformed interior spaces and narrow cross-sections which comprises casting into and filling said spaces with a zinc base die casting alloy harder than the copper blank to intimately contact the metals and support said cross-sections to be machined, machining the blank in paths intersecting said filled spaces and cross-sections, and then dissolving said filling metal by acid.

EMIL SIRP.

REFERENCES CITED

The following references are of record in the file of this patent:

UNITED STATES PATENTS

| Number | Name | Date |
|--------|------|------|
| 1,280,892 | Steenstrup | Oct. 8, 1918 |
| 1,891,304 | Everett | Dec. 20, 1932 |
| 2,159,391 | Martin | May 23, 1939 |

OTHER REFERENCES

The Brown and Sharpe Handbook, published 1927, page 73.